July 30, 1968   R. E. FUTER   3,394,463
ALTERING THE TEMPERATURE OF MATERIAL BY GAS CURRENTS
Filed Sept. 19, 1966   3 Sheets-Sheet 1
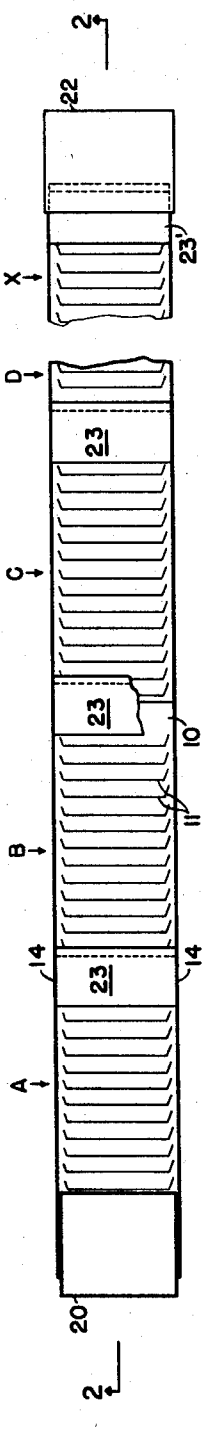
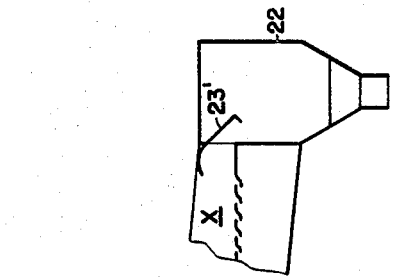
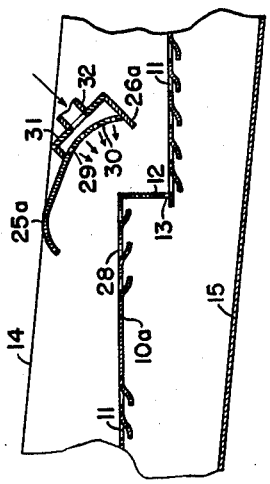
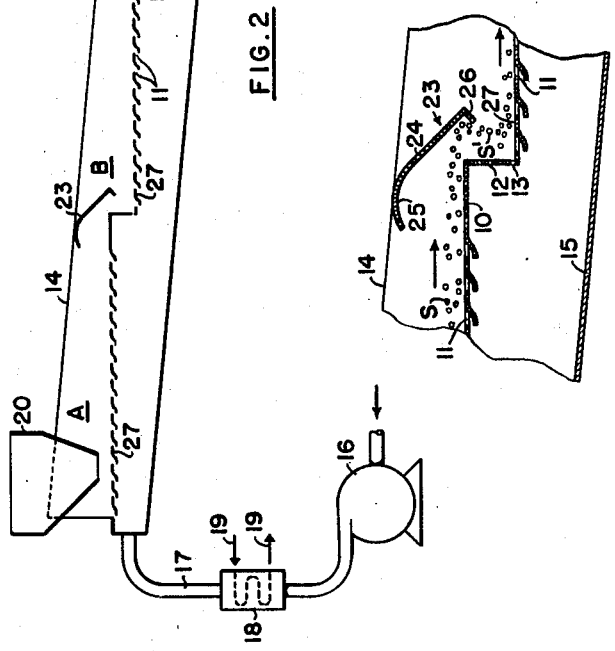

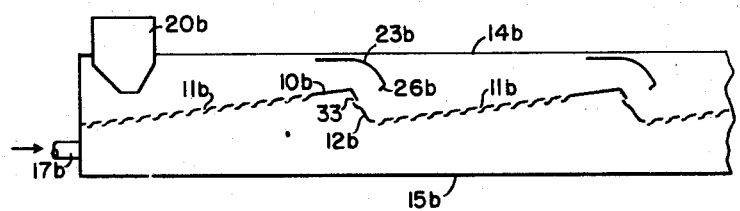
FIG. 5
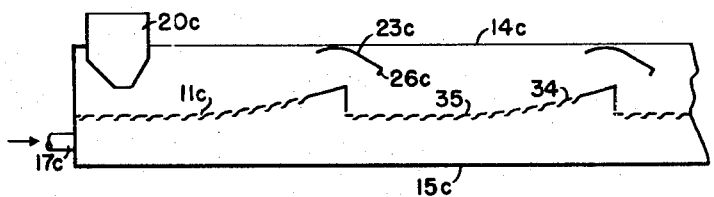
FIG. 6
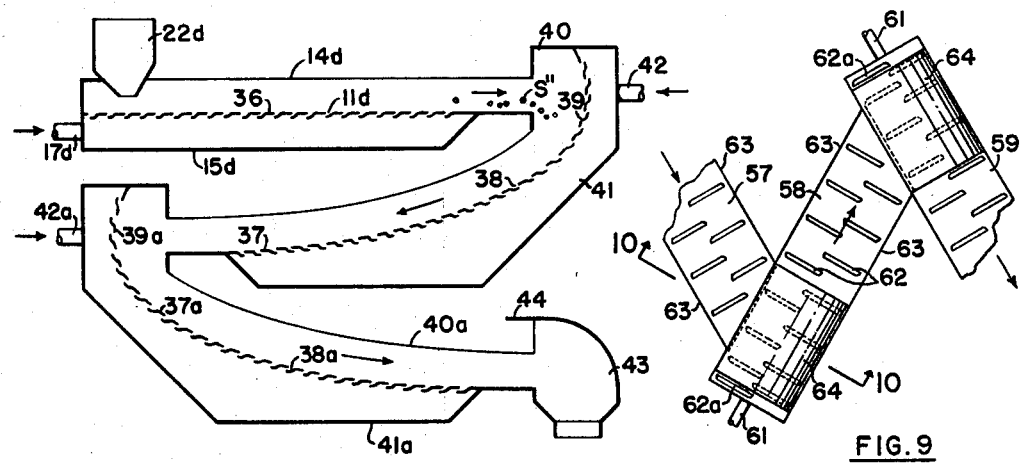
FIG. 7
FIG. 9
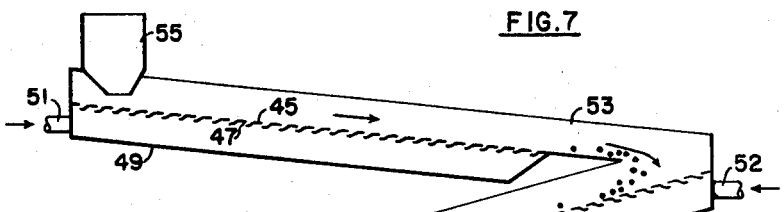
FIG. 8
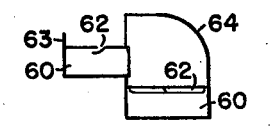
FIG. 10

United States Patent Office 3,394,463
Patented July 30, 1968

3,394,463
ALTERING THE TEMPERATURE OF MATERIAL BY GAS CURRENTS
Rudolph E. Futer, Oakland, Calif., assignor to Bangor Punta Operations, Inc., Oakland, Calif., a corporation of New York
Continuation-in-part of application Ser. No. 553,090, May 26, 1966. This application Sept. 19, 1966, Ser. No. 592,708
28 Claims. (Cl. 34—10)

ABSTRACT OF THE DISCLOSURE

The temperature of loose solid or liquid material is altered by accelerating it in each of a series of acceleration zones having apertured floors through which gas of a different temperature flows in a downstream direction, the movement of the material being checked, e.g., by a baffle or reverse gas jets, at the downstream end of each zone, so that the gas jets in each zone move with high relative velocity and disrupt the boundary layer which surrounds the material, to improve heat transfer.

---

This is a continuation-in-part of my application Ser. No. 553,090, filed May 26, 1966, now abandoned.

This invention relates to a method and an apparatus for altering the temperatures of solids or liquids by gas currents which engage and accelerate them, and move them along the surface of a bed, the gas currents being either warmer or colder; depending upon the dryness or moisture content of the gas, solid objects may be additionally dried or be made to absorb moisture. The invention is applicable, for example, to the treatment of sand, ash, ground cement, cement clinker, extruded wax, vegetables, berries, soap chips, metallic or plastic castings, and wrapped objects for a variety of purposes, and liquids such as water, milk, chemical solutions or mixtures. Among these are heating prior to treatment in an oven or other high temperature operation, sterilizing objects, and chilling objects, e.g., prior to wrapping vegetables or following a high-temperature operation.

It is known to change the temperature of objects by gas jets, and in my U.S. Patent No. 3,304,519, Feb. 21, 1967, is desscribed the use of a table or bed having a series of gas passages spaced longitudinally for jointly forming a gas current that propels the objects along the table. Described therein and in my U.S. Patent No. 3,267,585, Aug. 23, 1966, is the importance of high relative velocity between the gas and the objects for disrupting the gas sheath or "boundary layer" that forms a thermal insulation. It was further noted in said application that temperature changes in the objects are most rapid in the parts of the table whereat the objects are being accelerated by the gas. The said application further shows that a high velocity of the gas stream in the direction parallel to the table is achieved most effectively by the cooperative action of a series of longitudinally spaced gas jets, suggesting that such a series of jets is, in many instances, desirable, as when the table is open to the atmosphere above and it is desired to avoid blowing the objects off the table, and to attain high downstream gas velocities with a given consumption of power.

The said patent application, however, provided only a single acceleration zone for the objects. It would be desirable, for attaining very rapid heat transfer rates at a number of points along the table, to provide a succession of acceleration zones while avoiding such a buildup of speed as would result in excessive velocities in the material being acted upon. The latter limitation is dictated not only by the cost of providing ever faster gas jets but by the need to retain the objects on the table for the requisite residence time in contact with the gas without recourse to an excessively long table; further, excessive velocities may cause damage to fragile objects and lead to difficulties in discharging them.

Now according to the invention a more rapid heat transfer between the gas and the solid or liquid material is attained by moving the material successively over each of a series of acceleration beds, the material being supplied to each bed at a downstream velocity relative thereto that is materially less than the maximum downstream velocity attained relative to the preceding bed in the series, and the material is accelerated on each bed by gas that has a velocity relative to the material. For brevity, this movement of the material is called a "stop-and-go" movement, although in some embodiments no actual stopping occurs and the term "material" is used to denote the solid or liquid being treated.

More specifically, the material is accelerated in the downstream direction on each of a series of acceleration beds by gas streams, and the downstream velocity is checked at the end of each bed, either by transferring the material to another bed in which the downstream direction has a component opposite to that in the prior bed, or by decelerating the material at the downstream end of each bed by any suitable means, such as deceleration jets that flow upstream against the material and/or baffles mounted in the path of the material discharged from the beds so that the material impinges against the baffles and falls therefrom onto the next bed. When deceleration means are used the several beds can have a common downstream direction, e.g., straight or curved.

In either embodiment the surfaces of the successive beds are discontinuous, so that the material moves from each bed onto the charging zone of the next bed with a motion a component of which is normal to the latter. When the successive beds have opposed downstream directions, the downstream end of each bed is situated above the charging zone of the next bed; however, the latter bed may extend in the upstream direction beyond the charging zone, even to a level higher than the discharge end of the preceding bed, to accommodate a longitudinal series of gas passages which cooperate to form a high-velocity gas stream. Deceleration means may be used but are not necessary in such a system. However, when the successive beds have common downstream directions, separated by a downward step between each pair of adjacent beds deceleration means are essential.

The surfaces of the individual beds may be flat or curved in the transverse and/or the longitudinal direction. Thus, each bed may be flat transversely or trough-shaped, and when flat has side walls to retain the objects. The grades of these surfaces in the downstream direction may be declining, level or rising. In the first two instances the last bed of a series of beds arranged in a single row is lower than the first bed in the series. However, when the beds are inclined upwardly in the downstream direction the last bed in a row may be below, at the same level as, or higher than the first.

The choice of grade is made on the basis of the desired throughput rate of the material, the acceleration to be attained, and the nature of the material. An upward slope retards the material, particularly when it has a high density, leading to lower accelerations and an increase in the relative velocity between the gas and the material. However, this reduces the capacity of the system by causing a slower rate of movement. Further, unduly low velocities are undesirable because this can lead to stalling of the material, causing non-uniform exposures to the gas and non-uniform temperature conditioning; if very low velocities prevail there may be pockets or zones in which a large quantity of the material accumulates, making the gas stream less effective. Thus, when the material is solid, the gas may then not tumble the objects and sweep all sides thereof.

The series of beds is usually vented upwards to the atmosphere for the free escape of gas throughout all or most of their lengths, e.g., is open or has a cover with gas outlet openings. However, the several beds may form the confining wall of a whirl chamber having a more or less horizontal axis. In this case the material follows a helical path along the confining wall and the gas is discharged from the end of the chamber alone and/or together with the material. Although in this embodiment the beds of the series are situated side by side without any physical separation, they form a helical series in which each pair of adjacent beds are terminally juxtaposed and have common downstream directions.

The gas streams may be formed by projecting one or more gas jets through inclined openings that extend through the table or membrane constituting the beds. In addition or in lieu of such openings there may be jet means at the upstream end of each bed for projecting gas streams along the bed surfaces in the downstream direction.

The invention will be described in detail with reference to the accompanying drawings forming a part of this specification and showing certain preferred embodiments by way of illustration, wherein:

FIGURE 1 is a plan of a row of acceleration beds according to the invention;

FIGURE 2 is a longitudinal sectional view taken on the line 2—2 of FIGURE 1, additional parts being shown;

FIGURE 3 is an enlarged detail view of a part of FIGURE 2;

FIGURE 4 is a sectional view corresponding to FIGURE 2 showing a modified construction;

FIGURES 5 and 6 are fragmentary longitudinal sectional views showing two additional embodiments;

FIGURES 7 and 8 are longitudinal sectional views of two other embodiments, using beds having opposed downstream directions;

FIGURE 9 is a fragmentary plan of another embodiment, wherein the objects follow a zig-zag course;

FIGURE 10 is a sectional view taken on the line 10—10 of FIGURE 9;

Figure 11:
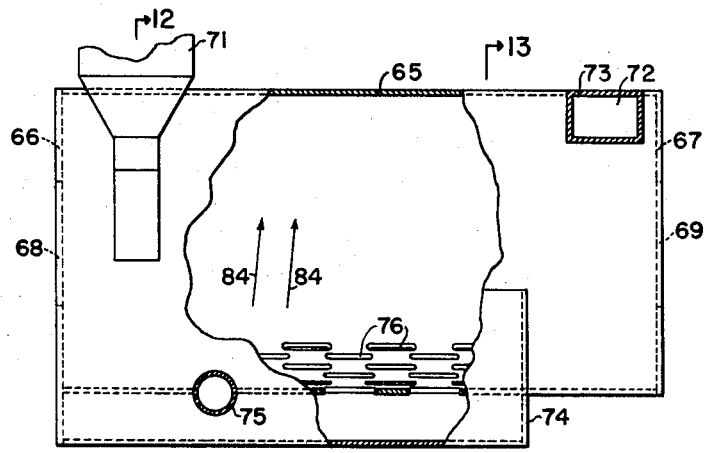
FIGURE 11 is an elevation of still another embodiment using a whirl chamber, parts being broken away to show the interior and certain parts appearing in section.
Figures 12, 13:
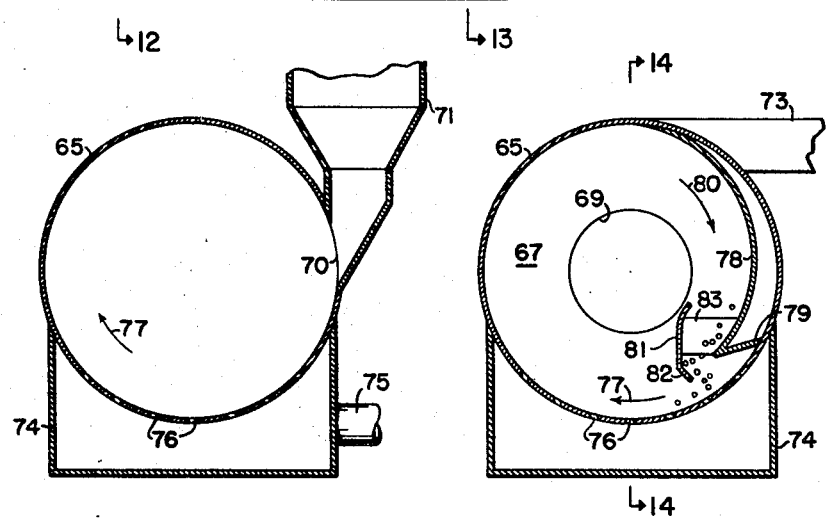
Figure 14:
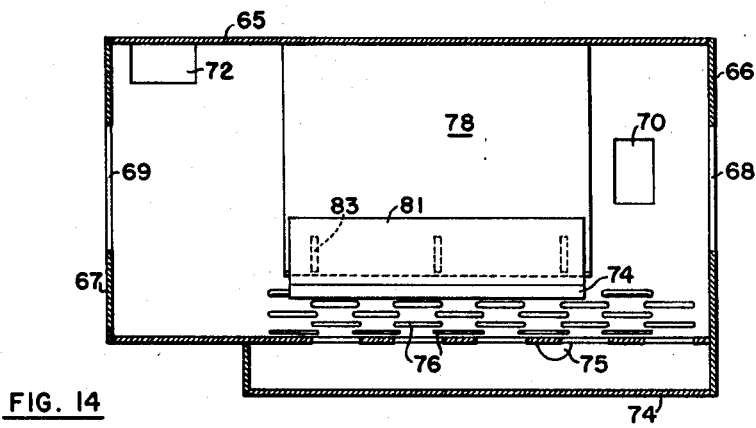

FIGURES 12 and 13 are transverse sectional views taken on the lines 12—12 and 13—13, respectively, of FIGURE 11; and FIGURE 14 is a longitudinal sectional view taken on the line 14—14 of FIGURE 13.

Referring to FIGURES 1-3, the system comprises a series of acceleration beds A, B, C, D, . . . X, each formed of a flat, horizontal table or membrane 10, e.g., sheet metal, having air passages 11, such as longitudinally spaced, transversely elongated slits with depressed downstream edges for emitting gas jets as nearly parallel to the surface as practicable, i.e., jets that move upwards with strong downstream inclinations. Each bed is at a lower level than the next bed upstream thereto. A vertical wall 12 depends from the downstream edge of each bed to or almost to the respectively adjacent lower bed. The bottom edges of the walls 12 may be spaced above the surfaces of the lower beds as shown to provide gas passages 13 (FIGURE 3) which supplement the jets from the passages 11. In some instances, as when the beds are short, the passages 13 may replace the passages 11. Side walls 14 extend upwards from the margins of the beds and a plenum chamber 15 extends along the bottom of the several beds to supply gas under pressure to the passages 11 and 13. This gas may be of any type, such as atmospheric air, pressurized by a compressor 16 and fed to the plenum chamber by a duct 17. The gas may be treated in a treating unit 18, which may be a heater or a cooler through which a thermal fluid, such as steam or a refrigerant, is circulated via pipes 19. The unit 18 may, if desired, also humidify or dehumidify the gas if the moisture content of solid objects is to be changed or controlled. The moisture added to the gas may be steam or the vapor of any liquid. Feed means, such as a hopper 20, optionally having flow control means such as a valve or a star feeder, not shown, supplies the material to the upstream region of the bed A. A receiving means, such as a hopper 22, is provided at the downstream end of the series.

Deceleration baffles 23 are mounted on the side walls 14 in the path of the material discharged from the downstream end of each bed save the last bed X of the series, and such a baffle, shown at 23', is optionally provided also for the last bed. As is best shown in FIGURE 3, each baffle includes an upwardly extending wall 24, preferably inclined upwards in the upstream direction and curved at 25 for guiding the gas, and a flange 26 that is angularly related to the wall 24 at the bottom thereof and extends in the upstream direction with a downward inclination. This flange is joined to the wall 24 to form a dihedral angle at about the level of the associated (upstream) bed so as to be impinged by the liquid or solid material. For example, solid objects S fall therefrom by gravity onto the charge zone of the next lower bed, as appears at S'. The charge zone, indicated at 27, is advantageously situated on each bed somewhat away from the extreme upstream end so that at least one and, preferably, several gas passages are situated upstream of the charge zone. This insures that all material is engaged by the gas stream.

A well-formed sheet of gas moving rapidly in approximately parallel relation to the table surface is best formed by a plurality of jets spaced apart longitudinally at intervals close enough for cooperation, i.e., so that there is at least one and, preferably, more jets in being (as distinguished from diffused, moving gas) above each downstream jet. For this reason it is desirable to provide a succession of passages 11 spaced along the bed throughout the major upstream part thereof, as shown. Further, the charge zones 27 have preferably gas jets upstream therefrom, although this is not an absolute requirement. As shown, the zone 27 of the bed A has two slits 11 upstream from the hopper and the zones 27 of the succeeding beds have at least one such slit in addition to the opening 13 upstream therefrom.

Although a single row of slits 11 is shown for convenience, it should be noted that other arrangements of the passages can be used, e.g., a plurality of longitudinal rows of staggered and laterally overlapping slits as shown in FIGURE 9, or a multitude of individual holes.

In operation, as applied to subdivided solid matter, the objects are fed loosely, either continuously or intermittently, from the feed hopper onto the charging zone 27 of the bed A and are engaged by the gas stream formed by the jets issuing from the slits 11. The objects are thereby accelerated and moved at gradually increasing velocity to the downstream end of the bed. The objects are engaged individually and tumbled, causing all sides thereof to be swept by the gas, which moves more rapidly. The objects move off the downstream end of the bed by inertia and impinge on the baffle 23, falling thence onto the charging zone of the next bed as shown at S' in FIGURE 3. In falling the objects may be carried downstream slightly by the gas stream before completing their fall, but the principal acceleration occurs on the bed itself. In other words, the objects reach the next bed with a negligible or low forward velocity, thereby making it possible to attain a high relative velocity between the gas and the objects and resulting in a new acceleration of the objects on each bed. This aids in disrupting the boundary layer of gas surrounding each object and leads to a rapid heat transfer between the gas and the objects on each bed.

When liquid is treated, it is similarly supplied from the feed hopper onto the charging zone, accelerated by the gas stream, and impinged against the baffle 23, from which it falls to the charging zone of the next bed; on the latter it is again accelerated downstream. However, in this case the liquid is broken up by the gas stream, forming many surfaces for intimate contact with the gas, and it moves as a dispersion or froth from which the gas is continuously escaping upwards. The side walls 14 are made higher to avoid spillage and, especially when high gas velocities are used, the beds may be covered by roofs having gas outlets, e.g., with their axes directed in the upstream direction to cause a change in flow direction of the gas and disengage entrained liquid by inertia. Such roofs being known per se, they are not shown.

The lengths of the beds are selected in accordance with the accelerations of the material than can be reasonably sustained by a given gas supply, limited by the maximum velocities that can be utilized without damage, such as excessive attrition of solid objects. It is to be noted that the heat transfer rate is greatest in the upstream portion of each bed, where the highest acceleration prevails, and diminishes toward its downstream end. By way of example, each bed may have a length of 6 to 60 inches, and the maximum downstream velocity of the objects is typically from 2 to 40 ft. per sec.

Any desired number of beds may be used in the series, such as two to twenty, depending upon such factors as the residence time required to effect the desired change in temperature and/or humidity and the maximum velocities used.

FIGURE 4, wherein like reference numbers denote previously described parts, shows two modifications that may be used independently, namely, deceleration jets emanating from the bed and deceleration jets emanating from above the bed. Each bed membrane 10a has slits 11 in its upstream portion as previously described, and has, in its downstream portion, openings 28 shaped to direct gas jets upstream. The latter may be of any form, e.g., like the slits 11 but reversed. Gas from the plenum chamber 15 emerges through the openings 28 and engage the material to decelerate it. These jets can be used in lieu of or in combination with any other decelerating means.

Gas jets from above the bed are formed by openings 29 in an orifice plate 30 which is backed by an auxiliary plenum chamber 31 to which gas under pressure is supplied through a duct 32. The plate 30 may be curved concavely as shown and mounted in the side walls 14. A wall 25a may extend upstream from the top of the plate 30 and a flange 26 may extend upstream with downward inclination; these parts have the functions described for the parts 25 and 26, respectively. The gas jets from the openings 29 engage the material leaving the associated bed to cause a gentle deceleration, whereby the material either does not strike the plate 30 or does so only with reduced impact. The parts 29–32 may be used either with or without the openings 28 in the associated bed. These features are of special value when fragile solid objects are treated.

FIGURE 5 shows an alternative arrangement in which parts corresponding to those previously described are denoted by like numbers but bearing the suffix b. The membranes 10b that constitute the beds are inclined upwardly in the downstream direction at constant grades, whereby all beds can be at the same level although adjacent beds are separated by steps at which walls 12b are provided. These walls 12b may be inclined and joined to the next lower membranes by curved sections, as shown, and are in this embodiment formed with gas passages 33 that direct gas from the plenum chamber 15b downwardly to sweep the walls and the curved sections. The deceleration baffles 23b with their flanges 26b are mounted in the side walls 14b.

FIGURE 6 shows another variant wherein corresponding parts are denoted by like numbers with the suffix c. The membranes 10c include sections 34 that are upwardly concave in the longitudinal direction and are joined smoothly to the horizontal, upstream sections 35. The downstream part of each bed is thereby inclined upwards to reduce the velocity or acceleration of the material and therefore the heat transfer is improved in the downstream portions of the beds. Also, successive beds can be placed at a common level.

FIGURE 7 shows an embodiment wherein successive acceleration beds have opposed downstream directions. Only three beds are shown, although any number may be used. The material is supplied by a feed hopper 22d onto the first or uppermost bed 36 which has a downstream direction toward the right. It has gas passages 11d, supplied from a plenum chamber 15d which receives gas through a duct 17d; side walls 14d are provided and the top of the bed is open to the atmosphere. The bed 36 may be horizontal as shown and may have any suitable cross sectional contour, such as flat or trough-shaped. From the downstream end of the bed 36 the material is discharged onto the second bed 37, having gas passages 38 (which may be formed as described for the passages 11) to emit jets which jointly form a gas stream tending toward the left, as indicated by the arrow. This bed may be curved to include a generally vertical upstream end part 39 which is also formed with gas passages directed downwardly and situated above the charge zone at which the material discharged from the bed 36 reaches the bed 37. Thereby a gas sheet is formed upstream of the charge zone, resulting in rapid acceleration of the material by a strong blast of gas. The second bed has confining side walls 40 that abut the ends of the walls 14d, and a plenum chamber 41 to which gas under pressure is supplied via a duct 42. Reference numbers 37a–42a, inclusive, denote corresponding, similarly constructed parts of a third acceleration bed which is positioned to receive the material discharge from the second bed and has a downstream direction toward the right. The beds 37 and 37a may be upwardly open as shown so that as can escape to the atmosphere freely along their lengths; again, they may have any suitable cross sectional contours or may be covered. From the third bed the material is discharged into a receiver, such as a bin 43 having a hood 44. All three beds may be in a common vertical plane.

In operation, material, whether solid or liquid, is accelerated on the first bed 36 as previously described for the first embodiment, and moves by inertia as shown at S" onto the surface of the bed 37. Although the forward motion of this material is not checked before it engages the second bed, it reaches this bed with negligible downstream velocity relative to the bed 37. The approach of the material to the bed 37 is only slightly downward. If the previous bed has its discharge end inclined upwards (as shown in FIGURES 5 and 6) the material would be rising while aproaching the surface of the bed 37.

Because the material enters the second bed 37 with a local downstream velocity which is materially less than the highest relative velocity attained on the bed, it is strongly accelerated by the gas stream and a high rate of temperature change or change in humidity is attained on the second bed. From the latter the material moves similarly downwards onto the third bed 37a, on which it is again accelerated by the gas stream thereon.

The arrangement shown in FIGURE 8 differs from that of FIGURE 7 in that the successive beds 45, 46, are flat and inclined at constant grades in their downstream directions; they again have opposed downstream directions, indicated by the arrows, in consequence of the dispositions of their gas passages 47, 48, which are supplied with gas by plenum chambers 49, 50, and ducts 51, 52. Side walls 53, 54, extend upwards from the bed margins. A feed hopper 55 supplies the material to an upstream part of the bed 45 and a bin 56 is positioned to receive the material from the bed 46. It is important with this arrangement to provide at least one and, preferably, several gas openings or other jet-forming means on the bed 46 upstream from the charging zone, so that the material transferred from the bed 45 is immediately engaged by a high-velocity gas stream and moved away from the charge zone. A deflector baffle, such as the baffle 23 previously described, can optionally be mounted beyond the downstream end of the bed 45 to decelerate the material.

The several beds of FIGURES 7 and 8 need not lie in a common vertical plane but may, for example, be related so that, in plan, they would appear as is shown in FIGURE 9.

FIGURES 9 and 10 show another arrangement comprising a series of beds 57, 58 and 59 which may be horizontal as shown, and are arranged in a zig-zag relation when viewed in plan. The upstream end of each bed is situated lower than the downstream end of the preceding bed. Each bed has a plenum chamber 60 to which gas is supplied through a duct 61 for flow through inclined gas passages 62 which are formed in the bed membranes in two rows of slits, the slits of the two rows being staggered longitudinally and being laterally overlapping. Each bed has side walls 63 extending upwards from its margins, and a hood 64 is optionally provided above each charge zone, joined to the side opposite to the downstream end of the preceding bed to guard against spillage of material.

In this arrangement the material discharged from the downstream end of each bed moved downwardly by gravity onto the charge zone of the next bed, which it enters transversely and with a slight upstream velocity. With other angular dispositions there may be zero upstream velocity or even a small downstream velocity. In any angular disposition, the material is strongly accelerated on the new bed by the gas thereon, which is preferably formed as a coherent sheet before engaging the material by providing at least some gas passages 62a upstream from the charge zone. The latter passages may be positioned at lesser intervals than the passages 62.

FIGURES 11–14 show the invention applied to a whirl chamber, such as that described in my U.S. patent application Ser. No. 486,965, filed Sept. 13, 1965. The whirl chamber includes a cylindrical confining wall 65 which may have a circular or other cross section and a substantially horizontal central axis, although this axis may be inclined. The chamber ends are closed by upstream and downstream walls 66, 67, respectively, which may be imperforate or have central openings 68, 69 therein. An inlet opening 70 is situated near one end, perferably above the bottom of the chamber and on the side on which the gas stream moved downward. The opening 70 is fitted with feed means, such as a hopper 71. Near the other end is an outlet opening 72 fitted with a tangential discharge duct 73. Extending through all or most of the length of the whirl chamber is a plenum chamber 74 to which gas under pressure is admitted through a supply duct 75. The plenum chamber extends peripherally about only so much of the chamber 65 as has gas passages 76, e.g., the lower quarter in the embodiment shown. The passages 76 are inclined to the local radii in a common circumferential direction to cause a gas stream to move in the direction of the arrow 77 in FIGURES 12 and 13. These passages may take any suitable form, such as slits. It will be understood that the passages 76 may take the form of louvers such as previously described, formed in sheet metal; however the chamber may be formed entirely or in part of thicker walls. The liquid or solid material is supplied in fluent or loose condition through the opening 70 and accelerated by the gas and swept about the inner surface of the wall of the chamber 65 a number of times, moving in a helical path. It is discharged together with some or all of the gas through the outlet opening 72.

According to this invention a curved plate or wall 78 is joined smoothly to the chamber wall near the top and tends away therefrom toward the bottom in the circumferential direction of gas flow. The bottom has a flange 79 which is joined to the chamber wall. Thereby the wall 78 forms a part of the confining wall of the whirl chamber insofar as the movement of gas and material is concerned, the direction of movement being indicated by the arrow 80. The wall of the chamber 65 may, of course, be given the shape described for the wall 78, which need not then be provided as a separate part. Spaced from the lower end of the wall 78 is a deceleration baffle or deflector 81, preferably having a flange 82 which is directed in the circumferential upstream direction and radially outwardly. This baffle may be mounted to the plate 78 by a plurality of narrow strips 83, as by welding. The plate 78 and baffle 81 may but need not extend the full length of the chamber 65. For example, as appears in FIGURE 14, they extend neither to the initial nor the final part of the chamber, near the inlet 70 and the outlet 72, respectively. This affords the material the opportunity to make one or more peripheral circuits before beginning the "stop-and-go" movement, and facilitates the discharge of all material from the chamber.

In operation, the material moves along helical paths as is indicated by the arrows 84. After moving over the plate 78 it strikes the baffle 81 and its movement is checked. The decelerated material falls from the flange 82 onto the part of the wall having gas passages 76 and is then accelerated by the gas stream. It will be noted from FIGURE 13 that several gas passages are provided upstream from the charge zone onto which the material falls from the flange 82, to insure a high-velocity gas stream upstream from the charge zone.

It will be understood that different portions of the material, in following helical paths, strike the baffle 81 repeatedly, and that the successive portions of the wall 78 and the wall of the chamber 65 which are traversed by the material are successive acceleration beds, although the several portions of the material may not follow identical paths.

It will be further understood that the gas supplied to each of the supply ducts 32, 17b, 17c, 17d, 42, 42a, 51, 52, 61, and 75 may be passed through a treater as is shown at 18 in FIGURE 1 for bringing the gas to the requisite temperature and/or humidity. Further, when the gas is costly, as when it is nitrogen, etc., hoods may be provided to collect and recover the gas from the several beds.

I claim:
1. The method of altering the temperature of fluent material by gas currents which comprises the steps of:
   (a) supplying said material to an upstream part of a series of acceleration zones each of which has a supporting surface for the downstream movement thereon of said material, each of said surfaces being discontinuous with the surface of the respectively adjacent downstream zone,
   (b) flowing a gas stream predominantly downstream in each of said zones at a temperautre different from that of the material on the surface thereof and engaging the material in each zone by the respective stream, thereby accelerating the material in each zone and moving it to the downstream ends of the zones, and
   (c) decelerating said material substantially at and transferring the material from the downstream end of each zone save the last in the series to an upstream part of the respectively adjacent downstream zone with movement toward the surface of the latter zone and with a downstream velocity relative to the last mentioned surface materially less than the greatest downstream velocity of the material relative to the surface of the preceding zone in the series, thereby effecting a high velocity of the gas streams relative to the material in each of said adjacent zones to produce a rapid heat transfer between the gas and the material.

2. Method as defined in claim 1, wherein said material is decelerated in the downstream portion of a zone other than the last in the series by projecting at least one gas jet in the upstream direction through said downstream portion of the zone and engaging the material with said upstream jet.

3. The method according to claim 2 wherein said upstream jet is projected upwardly with an upstream inclination through the surface of the zone that contains said downstream portion.

4. Method as defined in claim 1 wherein said gas streams are formed at least in part by projecting within each zone a plurality of individual gas jets from a plurality of longitudinally spaced points, said jets being inclined upwards relatively to the said downstream direction.

5. Method as defined in claim 1 wherein adjacent zones have substantially common downstream directions and the adjoining parts of the different surfaces of said zones are relatively displaced with the downstream surface beneath the plane of the upstream surface.

6. Method as defined in claim 5, wherein the downstream movement of said material is decelerated at the downstream end of each said acceleration zone before transferring the material to the respectively adjacent downstream zone.

7. Method as defined in claim 6 wherein said step of decelerating the material includes impinging the material against a surface disposed in the path of the material to impede its downstream movement, and the material is moved by gravity from said impeding surface onto the surface of the respectively downstream zone.

8. Method as defined in claim 6 wherein said step of decelerating the material includes the steps of projecting at least one gas jet in the upstream direction from a point beyond the said downstream end and above it, and thereafter moving the material by gravity onto the surface of the respectively adjacent downstream zone.

9. Method as defined in claim 5 wherein said gas streams are formed at least in part by projecting gas substantially parallel to the surfaces of said respectively adjacent zones from the upstream ends thereof at levels below those of the downstream ends of the surfaces of the respectively adjacent upstream zones.

10. Apparatus for altering the temperature of fluent material by gas currents having temperatures different from that of the material, which comprises, in combination:
(a) a series of acceleration beds each of which provides a supporting surface for the downstream movement thereon of said material, said beds being relatively disposed for the passage of said material successively over the several beds and the surface of each bed being discontinuous with that of the respectively adjacent downstream bed such that material discharged from the downstream end of each bed approaches the surface of the respectively adjacent downstream bed with a component normal to the latter surface,
(b) means for supplying said material to a bed which is upstream in said series,
(c) means for forming on each of said beds a gas stream moving predominantly in the downstream direction thereof for engaging the material thereon and moving the same to the downstream end of each bed for transfer from each bed save the last in the series onto the upstream part of the respectively adjacent downstream bed, and
(d) means situated in the path of the material substantially at the downstream end of each zone for decelerating the material,
(e) the means for forming the gas streams being constructed to form gas currents on each of said adjacent beds with downstream velocities sufficient to accelerate the material thereon for effecting a high relative velocity of the gas to the material to cause a rapid heat transfer between the gas and the material.

11. Apparatus as defined in claim 10 wherein said deceleration means includes jet means for projecting at least one gas jet in the upstream direction over the downstream portion of a bed against the moving material.

12. Apparatus as defined in claim 12 wherein said jet means includes an opening extending upwardly with upstream inclination through a downstream portion of the respective bed, and means for supplying gas to the underside of said bed portion.

13. Apparatus as defined in claim 10 wherein said deceleration means includes jet means situated above and in the vicinity of the downstream end of an associated bed for projecting at least one gas jet in the upstream direction against the material being discharged from said bed.

14. Apparatus as defined in claim 10 wherein said deceleration means includes a baffle situated beyond the downstream end of an associated bed in the path of the material discharged therefrom so as to be impinged by said material, said baffle being spaced from said bed to permit said material, after impingement, to fall from the baffle onto the adjacently downstream acceleration bed.

15. Apparatus as defined in claim 14 wherein said baffle extends transversely to the direction of movement of said objects and includes;
(a) an upwardly extending wall, and
(b) a flange at the lower part of said wall directed angularly to the wall in the upstream direction at a level below the downstream end of the surface of said associated bed.

16. Apparatus as defined in claim 15 wherein said upwardly extending wall is inclined in the upstream direction for guiding gas away from the material that impinges on the baffle.

17. Apparatus as defined in claim 10 wherein the means for forming said gas streams comprises, for each bed, at least one gas opening extending through a part of said bed with downstream inclination, together with means for supplying gas to the undersides of said parts of the beds.

18. Apparatus as defined in claim 10 wherein the means for forming said gas streams comprises, for each bed, a plurality of longitudinally spaced gas openings extending through a part of the bed with downstream inclinations, said gas openings being provided throughout at least the major upstream extent of each bed, each bed having means for supplying gas to the undersides of said parts of the beds including a plenum chamber in communication with a plurality of said openings.

19. Apparatus as defined in claim 10 wherein the means for forming said gas streams comprises, for at least one bed, jet means situated at the upstream end of said bed above the surface thereof and below the level of the respectively adjacent upstream bed.

20. Apparatus as defined in claim 10 wherein said beds collectively constitute the confining wall of an elongated, peripherally closed whirl chamber having a generally horizontal axis, the said means for supplying the material including an inlet opening in said wall near one axial end of the chamber and said chamber having a discharge opening for said material near the other axial end thereof, whereby said material follows a generally helical path in moving peripherally about said chamber and successively over said beds.

21. Apparatus as defined in claim 20 wherein:
(a) said confining chamber is shaped with a step away from said axis in the downstream direction, said step being situated in a lower part of the chamber and being elongated in the axial direction so as to be traversed a plurality of times by said helical path, and
(b) said deceleration means includes a baffle situated within the chamber and mounted generally parallel to said step and similarly elongated, said baffle being spaced from said wall and situated in the path of the material discharged from the part of the wall upstream from said step.

22. Apparatus as defined in claim 10 wherein said beds are terminally juxtaposed in a single row and have common downstream directions.

23. Apparatus as defined in claim 22 which includes a downward step in the downstream direction between each pair of adjacent beds, said means for decelerating said material at the downstream end of each bed save the last in the series being disposed for transferring the decelerated material with reduced downstream velocity downwardly onto the surface of the respectively adjacent downstream bed.

24. Apparatus as defined in claim 23 wherein each bed save the first in the series is situated at a level that is lower than the level of the preceding bed in the series.

25. Apparatus as defined in claim 23 wherein each bed is, at least in part, inclined upwardly in the downstream direction.

26. Apparatus as defined in claim 10 wherein the surfaces of at least two of said beds are upwardly concave and the downstream part of each said concave surface is upwardly inclined in said downstream direction.

27. Apparatus for altering the temperature of fluent material by gas currents having temperatures different from that of the material, which comprises, in combination:
  (a) a series of acceleration beds each of which provides a supporting surface for the downstream movement thereon of said material, each bed save the upstream bed being situated beneath the next preceding bed in the series and having the downstream direction thereof directed oppositely to that of the preceding bed, said beds being relatively disposed for the passage of said material successively over the several beds and the surface of each bed being discontinuous with that of the respectively adjacent downstream bed such that material discharged from the downstream end of each bed approaches the surface of the respectively adjacent downstream bed with a component normal to the latter surface,
  (b) means for supplying said material to a bed which is upstream in said series, and
  (c) means for forming on each of said beds a gas stream moving predominantly in the downstream direction thereof for engaging the material thereon and moving the same to the downstream end of each bed for transfer from each bed save the last in the series onto the upstream part of the respectively adjacent bed,
  (d) the means for forming the gas streams being constructed to form gas currents on each of said adjacent beds with downstream velocities sufficient to accelerate the material thereon for effecting a high relative velocity of the gas to the material to cause a rapid heat transfer between the gas and the material.
  (e) whereby the material follows a downwardly tending zig-zag path.

28. Apparatus for altering the temperature of fluent material by gas currents having temperatures different from that of the material, which comprises, in combination:
  (a) a series of acceleration beds each of which provides a supporting surface for the downstream movement thereon of said material, each bed being oriented with its downstream direction angularly related in plan to adjacent beds, said beds being relatively disposed for the passage of said material successively over the several beds and the surface of each bed being discontinuous with that of the respectively adjacent downstream bed such that material discharged from the downstream end of each bed approaches the surface of the respectively adjacent downstream bed with a component normal to the latter surface,
  (b) means for supplying said material to a bed which is upstream in said series, and
  (c) means for forming on each of said beds a gas stream moving predominantly in the downstream direction thereof for engaging the material thereon and moving the same to the downstream end of each bed for transfer from each bed save the last in the series onto the upstream part of the respectively adjacent bed,
  (d) the means for forming the gas streams being constructed to form gas currents on each of said adjacent beds with downstream velocities sufficient to accelerate the material thereon for effecting a high relative velocity of the gas to the material to cause a rapid heat transfer between the gas and the material,
  (e) whereby said material follows, in plan, a zig-zag path.

References Cited

UNITED STATES PATENTS 2,929,152  3/1960  Berner _____ 34—57

JOHN J. CAMBY, *Primary Examiner.*